(No Model.)
W. J. LAPWORTH.
ADJUSTABLE BOXING FOR VEHICLE WHEELS.
No. 549,646. Patented Nov. 12, 1895.
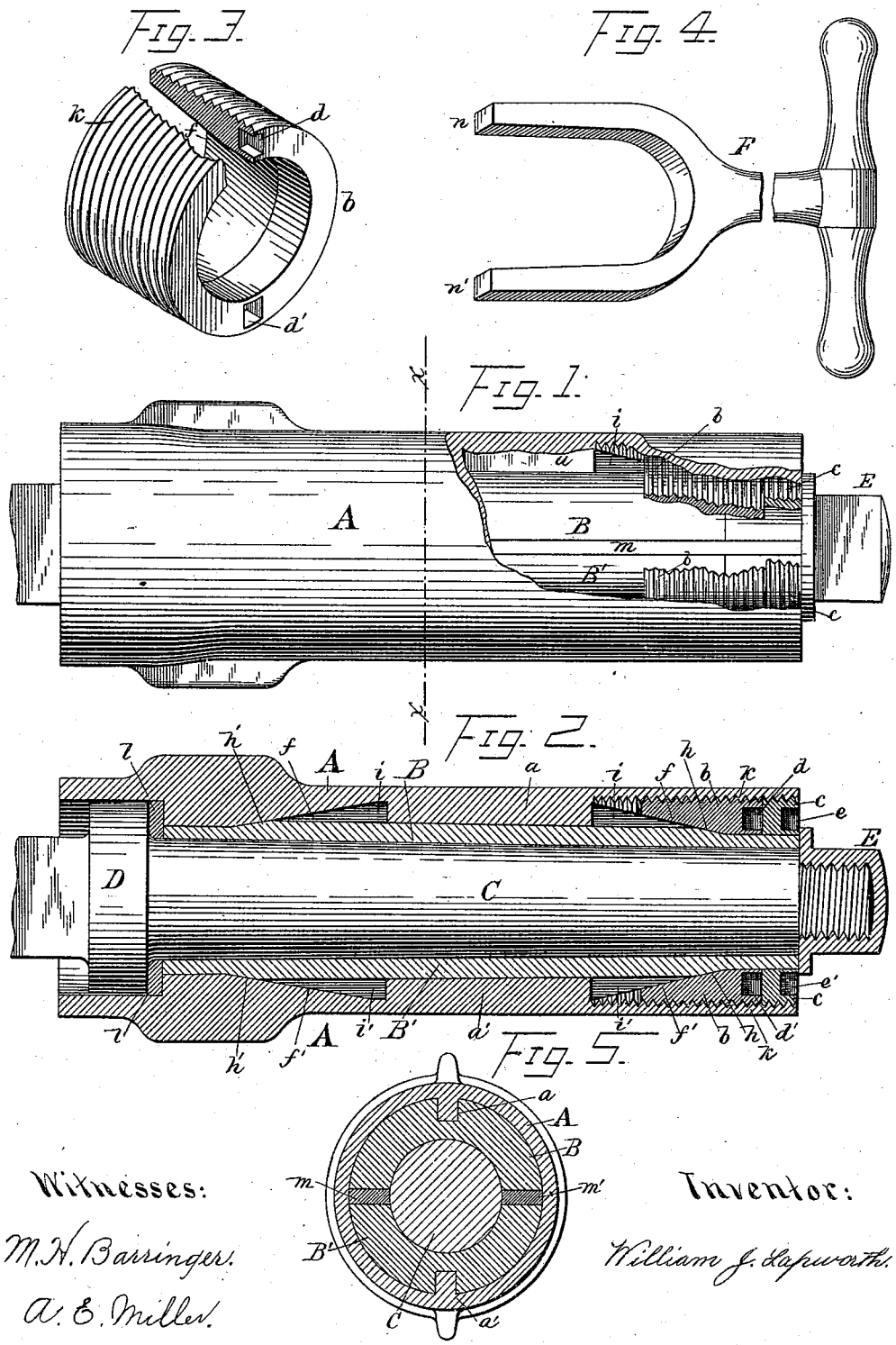
Witnesses:
M. H. Barringer.
A. E. Miller.
Inventor:
William J. Lapworth.

UNITED STATES PATENT OFFICE.

WILLIAM J. LAPWORTH, OF BEATRICE, NEBRASKA.

ADJUSTABLE BOXING FOR VEHICLE-WHEELS.

SPECIFICATION forming part of Letters Patent No. 549,646, dated November 12, 1895.

Application filed July 6, 1895. Serial No. 555,138. (No model.)

*To all whom it may concern:*

Be it known that I, WILLIAM J. LAPWORTH, a citizen of the United States, residing at Beatrice, in the county of Gage and State of Nebraska, have invented a new and useful Adjustable Boxing for a Vehicle-Wheel, of which the following is a specification.

My invention relates to the improvement over the old non-adjustable box; and the objects of my improvements are, first, to provide an adjustable boxing that will at all times be as firm as a solid box; second, one that will keep the wheel firm and true and have a much longer life than the solid box; third, one that can be adjusted by any person. I attain these objects by methods shown in the accompanying drawings, in which—

Figure 1 is a side elevation of the solid box with the upper right-hand corner broken away, so as to show the outside of box B B'. $m$ is the metallic distance pieces or liners; $b$, wedge-nut for setting up the boxing; $c$, lock-nut to secure wedge-nut $b$; $i$, key-seat in boxing B. $a$ is a key on box A to prevent boxing B B' from revolving. E is a nut on axle.

Fig. 2 is a longitudinal section of Fig. 1. A A is the solid box; B B', the adjustable boxing; $a\ a'$, keys; $i\ i$, key-seats; $f\ f'$, angle of wedge on boxing B B'; $h$, angle on wedge-nut $b$; $k$, threads; $d\ d'$, wrench-slots; $c$, lock-nut; $e\ e'$, wrench-slots. C is the axle; D, collar; $l$, leather washer; E, nut on end of axle.

Fig. 3 is a perspective view of wedge-nut $b$, broken away to show angle of wedge; $d\ d'$, wrench-slots; $k$, threads.

Fig. 4 is the wrench for adjusting nuts $b$ and $c$.

Fig. 5 is a transverse section of Fig. 1 on line $x\ x$. $a\ a'$ are the fixed keys; A, solid box; B B', adjustable boxing; $m\ m'$, metallic liners; C, axle.

To adjust boxing, take out lock-nut $c$, slack back wedge-nut $b$, reduce liners $m\ m'$ to proper thickness, set up wedge-nut $b$, and lock with nut $c$, which will leave the boxing solid and firm, as when new.

What I claim as my invention, and desire to secure by Letters Patent, is—

In a boxing for a vehicle wheel, the combination, with the box A provided with a conical portion at one end, a screw-threaded chamber at the other end, and a cylindrical middle portion provided with keys; of two half bearings B B' for the axle, provided with conical ends and a cylindrical middle portion having slots engaging with the said keys, removable liners $m$ interposed between the said half bearings, and a nut screwed into the said chamber and provided with a conical portion encircling one end of the said half bearings, and operating when screwed up to tighten the said half bearings upon the said liners, thereby forming a substantially solid cylindrical bearing for the axle, substantially as set forth.

WILLIAM J. LAPWORTH.

Witnesses:
J. S. RUTHERFORD,
M. H. WATTS.